United States Patent
Hauser et al.

(10) Patent No.: US 9,328,860 B1
(45) Date of Patent: May 3, 2016

(54) MOUNT FOR SUSPENDING AND SELECTIVELY POSITIONING AN OBJECT

(71) Applicant: Matthew Steven Hauser, Advance, NC (US)

(72) Inventors: Matthew Steven Hauser, Advance, NC (US); Brian Lee Keeton, Advance, NC (US)

(73) Assignee: Matthew Steven Hauser, Advance, NC (US)

( * ) Notice: Subject to any disclaimer, the term of this patent is extended or adjusted under 35 U.S.C. 154(b) by 0 days.

(21) Appl. No.: 14/279,718

(22) Filed: May 16, 2014

Related U.S. Application Data

(60) Provisional application No. 61/825,294, filed on May 20, 2013.

(51) Int. Cl.
| | |
|---|---|
| *B62B 3/14* | (2006.01) |
| *F16M 11/06* | (2006.01) |
| *F16M 11/42* | (2006.01) |
| *B62B 1/12* | (2006.01) |

(52) U.S. Cl.
CPC ............... *F16M 11/06* (2013.01); *B62B 3/14* (2013.01); *F16M 11/42* (2013.01); *B62B 1/12* (2013.01)

(58) Field of Classification Search
CPC .................................. B62B 3/14; B62B 1/12
USPC .............. 280/651, 33.996, 639, 47.18, 47.19; 42/84
See application file for complete search history.

(56) References Cited

U.S. PATENT DOCUMENTS

| | | | | | |
|---|---|---|---|---|---|
| 3,358,504 | A | * | 12/1967 | Freebairn ................ | F41A 23/16 73/167 |
| 4,253,648 | A | * | 3/1981 | Meeks ............................. | 269/4 |
| 4,621,563 | A | * | 11/1986 | Poiencot ................ | F41A 23/16 73/167 |
| 4,961,337 | A | * | 10/1990 | Henning et al. ................. | 72/426 |
| 5,141,211 | A | * | 8/1992 | Adams, Jr. ....................... | 269/16 |
| 5,209,517 | A | * | 5/1993 | Shagoury ....................... | 280/654 |
| 5,375,804 | A | * | 12/1994 | Levilly ..................... | F41A 23/16 248/286.1 |
| 5,933,999 | A | * | 8/1999 | McClure ................... | B60R 7/14 42/94 |
| 6,024,348 | A | * | 2/2000 | Ventura et al. ................... | 269/17 |
| 6,494,445 | B1 | * | 12/2002 | Bellis, Jr. ......................... | 269/71 |
| 7,083,174 | B2 | * | 8/2006 | Kane .............................. | 280/47.2 |
| 7,341,006 | B2 | * | 3/2008 | Hernandez ..................... | 108/115 |
| 8,033,553 | B1 | * | 10/2011 | Feliciano et al. .......... | 280/47.18 |
| 8,104,787 | B2 | * | 1/2012 | Haley ............................ | 280/639 |
| 8,166,695 | B2 | * | 5/2012 | Pippin ..................... | F41A 23/06 224/519 |
| 8,353,487 | B2 | * | 1/2013 | Trusty et al. .................... | 248/121 |
| 8,544,202 | B2 | * | 10/2013 | Bastian, Jr. .............. | F41A 23/18 42/94 |
| 8,608,395 | B2 | * | 12/2013 | Bober et al. ..................... | 401/48 |
| 8,931,201 | B2 | * | 1/2015 | Gianladis ................ | F41A 23/18 42/94 |
| 2004/0237372 | A1 | * | 12/2004 | Frye ........................ | F41A 23/16 42/94 |
| 2006/0192366 | A1 | * | 8/2006 | Kimberley ..................... | 280/651 |

* cited by examiner

*Primary Examiner* — Tony Winner
*Assistant Examiner* — Marlon Arce
(74) *Attorney, Agent, or Firm* — NK Patent Law, PLLC

(57) ABSTRACT

A mount for supporting a gun, bow, or other object is provided. The mount includes a support for contacting a ground surface, a beam extending from the support and being pivotable relative thereto, and a first and second clamp assembly extending from the beam for clamping the object thereabout.

7 Claims, 6 Drawing Sheets

MOUNT FOR SUSPENDING AND SELECTIVELY POSITIONING AN OBJECT

CROSS-REFERENCE TO RELATED APPLICATIONS

This application claims priority to U.S. Provisional Patent Application No. 61/825,294 filed on May 20, 2013, the entire contents of which are hereby incorporated by reference.

TECHNICAL FIELD

This disclosure is related to a mount for suspending an object. The object may be, for example, a firearm such as a rifle, a compound bow, or any other generally elongate object. The mount may also be provided for selectively positioning the object, such as, for example, to clean the object or make repairs to the object.

BACKGROUND

It is well known that firearms require routine maintenance and repair. Traditionally, whenever such maintenance or repair was required, the firearm was held by hand or secured in some form of common mechanical vise. The vise mechanisms usually clamped or held the firearm on the barrel or butt stock or both, and if caution was not exercised, the vice mechanisms would not hold the firearm securely during bore cleaning or routine maintenance, or worse yet, would mar the firearm.

Another conventional form of holding device secures the firearm at the butt stock and supports the barrel and fore end at one or more longitudinal points along the firearm. This type of device will hold most fully assembled firearms for the relatively simple process of barrel cleaning, but is not readily adaptable for the task of cleaning and maintaining complex firearms that require the taking down and separating of the various firearm components.

Another type of firearm holding device used for the cleaning of firearms that fold or pivot at a pivot point, holds the firearm in the broken open position for cleaning of the barrel but does not allow access to the internal mechanical parts that must also be cleaned.

Each of these conventional methods and devices includes one or more disadvantages. For example, the devices are not easily adaptable for firearms of varying sizes. Additionally, the devices do not provide appropriate and acceptable ranges of movement so that the firearm can be placed in a desired position.

A need therefore exists for a method or solution that addresses these disadvantages.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a mount for supporting a gun, bow, or other object. The mount includes a support for contacting a ground surface, a beam extending from the support and being pivotable relative thereto, and a first and second clamp assembly extending from the beam for clamping the object thereabout.

According to one or more embodiments, the beam is selectively positionable about the support.

According to one or more embodiments, the clamp assemblies are selectively positionable about the support.

According to one or more embodiments, the clamp assemblies define translatable clamp plates for clamping the object therein.

According to one or more embodiments, the beam is rotatable in a yaw direction relative to the support to selectively orient the clamp assemblies.

According to one or more embodiments, the support includes a wheeled assembly.

According to one or more embodiments, the support includes a pivot at a bottom portion thereof so that the support can be transported.

According to one or more embodiments, the pivot includes a handle for locking the beam in a desired orientation.

According to one or more embodiments, the clamp assemblies include an arm pivoted from the beam such that a distal end of the clamp assembly moves arcuately relative to the beam.

According to one or more embodiments, the mount includes a tray extending from the support According to one or more embodiments, the beam is separable from the support.

According to one or more embodiments, a mount for supporting an object is provided. The mount includes a support for contacting a ground surface, a beam extending from the support and being pivotable relative thereto about an arcuate groove and a pin assembly, and a first clamp assembly and a second clamp assembly extending from the beam for clamping the object thereabout. The first clamp assembly and the second clamp assembly are translatable along the length of the beam. The first clamp assembly and the second clamp assembly are pivotable relative to the beam.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent.

Rather, the inventors have contemplated that the claimed invention might also be embodied in other ways, to include different steps or elements similar to the ones described in this document, in conjunction with other present or future technologies.

Figure 1:
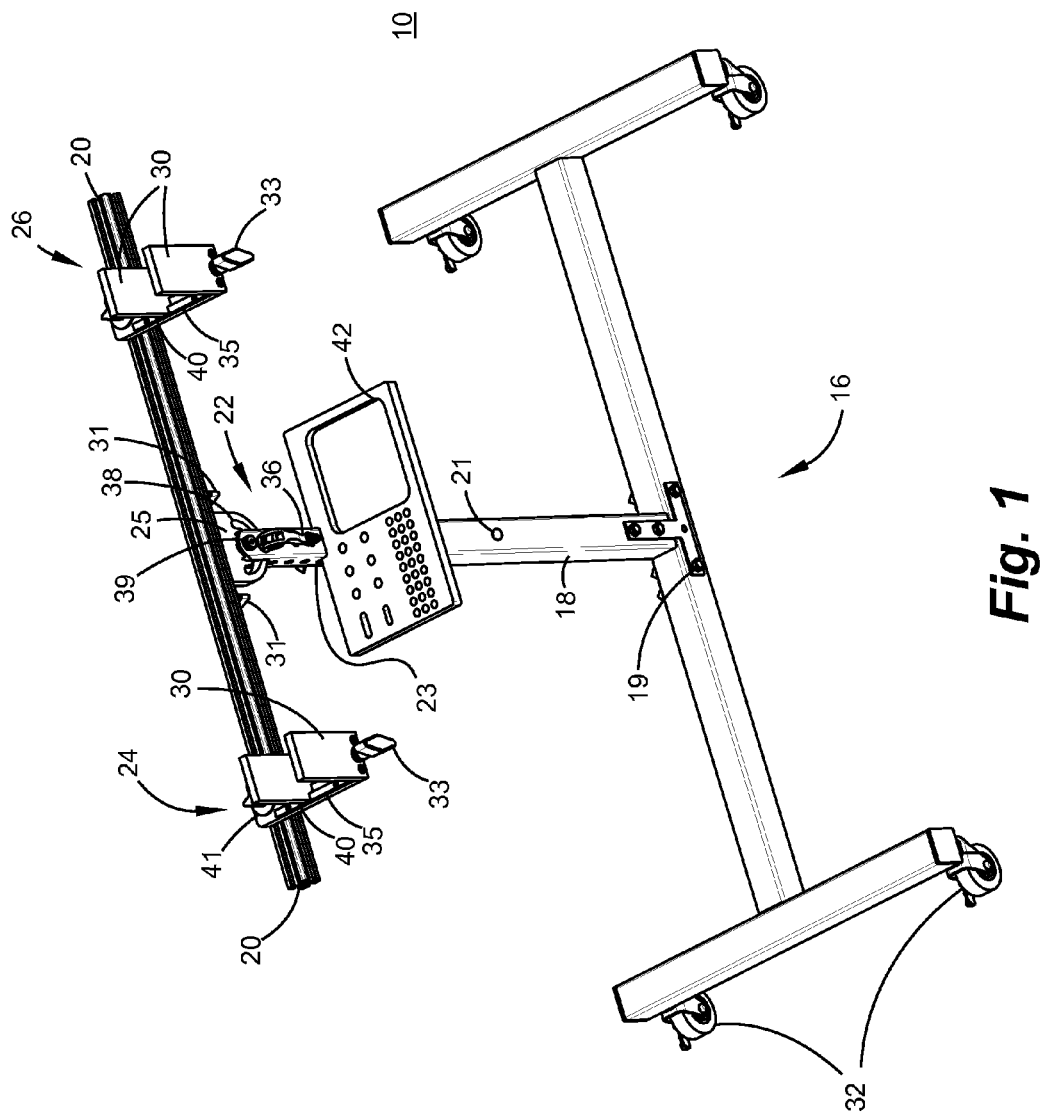
FIG. 1 is a perspective view of a mount for supporting a gun, bow, or other object according to one or more embodiments disclosed herein.
Figure 2:
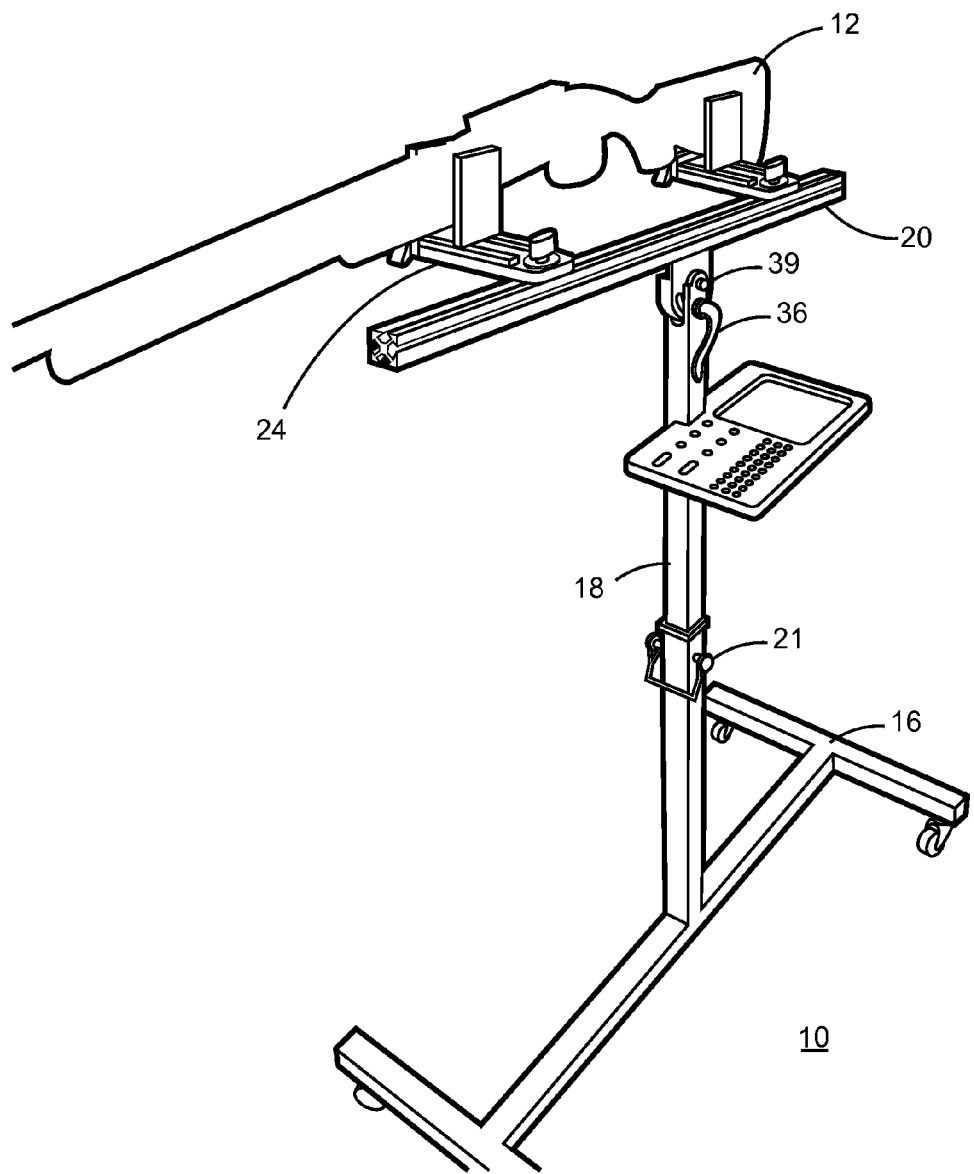
FIG. 2 is a perspective view of a mount supporting a gun according to one or more embodiments disclosed herein.
Figure 3:
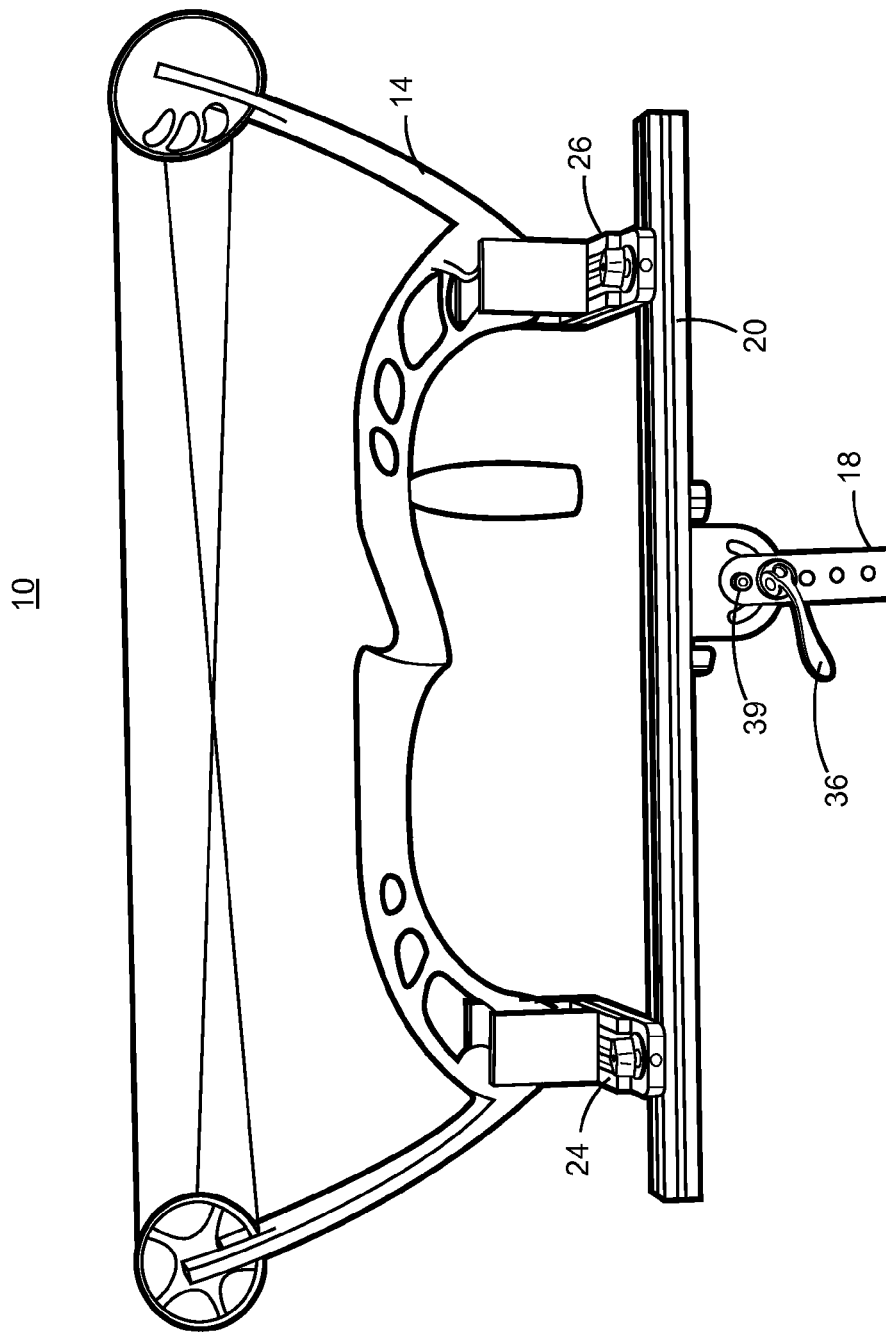
FIG. 3 is a front, partial view of a mount supporting a bow in a first position according to one or more embodiments disclosed herein.
Figure 4:
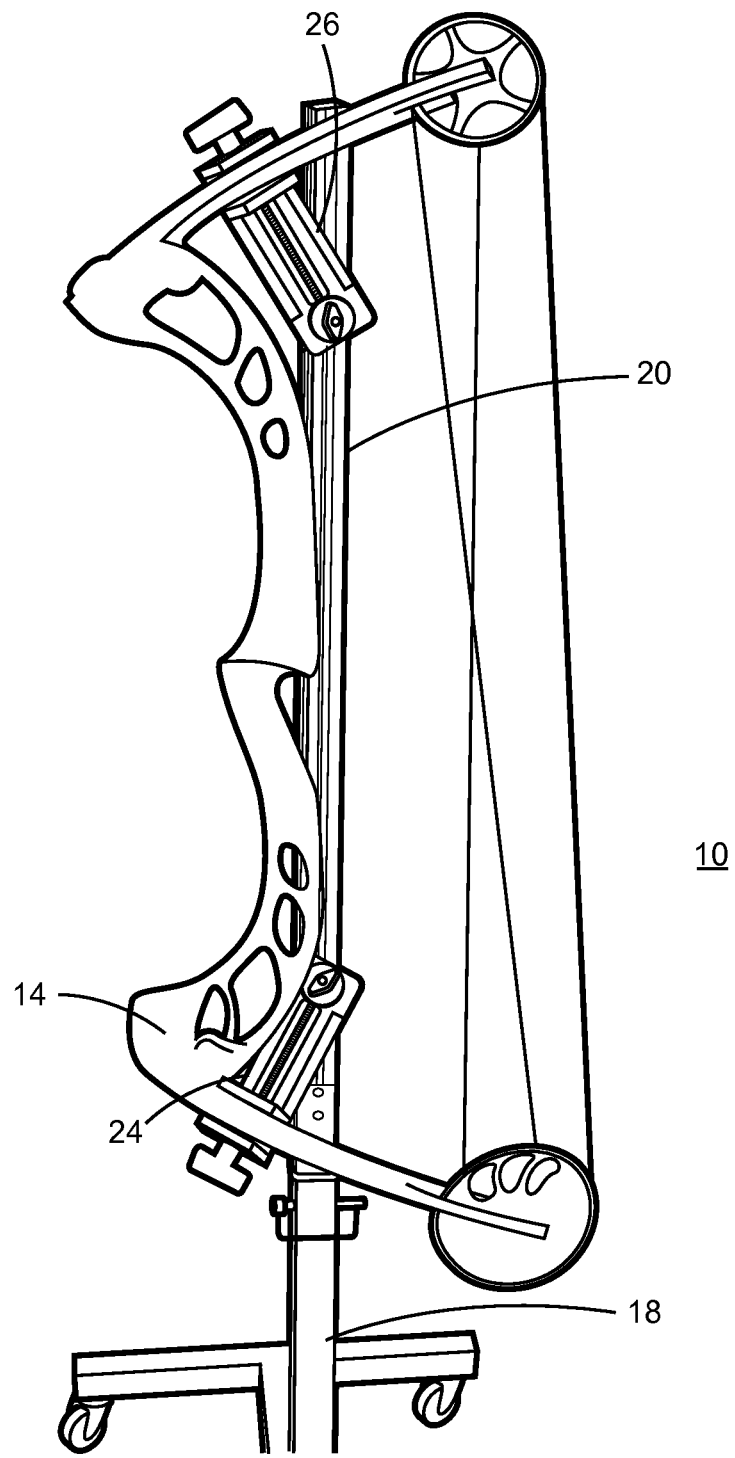
FIG. 4 is a side view of a mount supporting a bow in a second position according to one or more embodiments disclosed herein.

A mount for supporting a gun 12, bow 14, or other object is illustrated throughout the drawings and generally designated 10. Any object being generally elongate in definition may be utilized with the mount 10 described herein. The mount 10 may be used for a gun 12 (such as is shown in FIG. 2) or a bow 14 (such as is shown in FIG. 3 and FIG. 4) or any elongate object. The mount 10 includes a support 16 for contacting a ground surface G. The support 16 is illustrated in one or more configurations throughout the drawings, but any suitable support configuration may be employed. Support 16 may include a wheeled assembly 32 as illustrated for providing maneuverability. Alternatively, support 16 may be, for example, an upright that is fixedly engaged to a ground surface.

Support 16 may also include a brace 34 about which an upper portion 18 of the support 16 may be pivoted downward by removing one of fasteners 19 and then pivoting upper portion 18 towards the ground surface. This feature allows for portability and collapsibility of the mount 10. One or more pins 21 may be provided with corresponding openings formed in support portion 23 for adjusting the height of the support 16. A tool tray 42 may also be provided for holding one or more mounts.

The mount 10 may include a beam 20 extending from the support 16. The beam 20 may be pivotable about pivot joint 22. This feature allows the beam 20 to be pivotable 22 relative to the support 16. This advantageously provides for pivotable movement of the beam 20 into any desired orientation. For example, if a person wanted to position an object in a generally vertical orientation (such as the bow shown in FIG. 4), they could do so by tilting the beam 20 appropriately. The pivot 22 may include a lock handle 36 that locks the pivot 22 into a desired orientation. An arcuate slot 38 may be provided to which a fastener 39 extends through support portion 23 and into a base 25 of beam 20.

Figure 5:
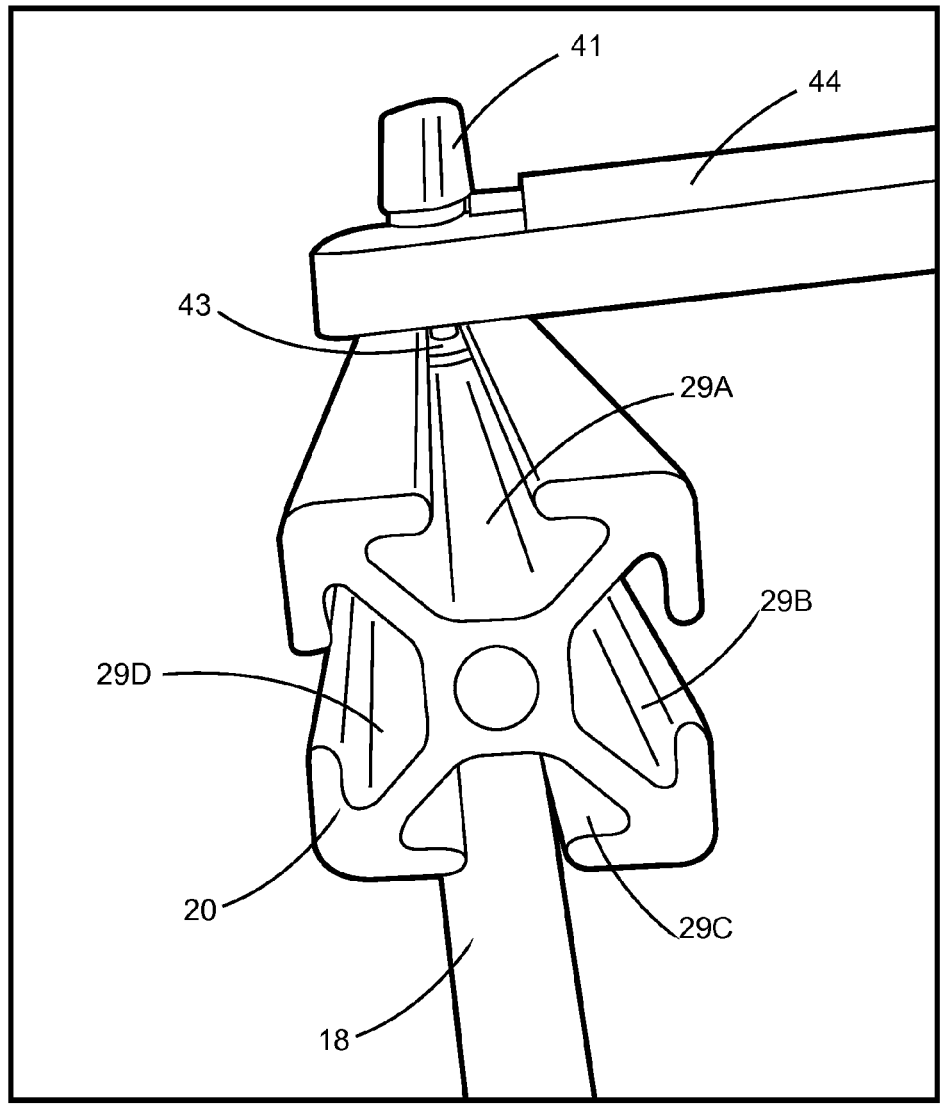
FIG. 5 is a side view of a beam for use with the mount according to one or more embodiments disclosed herein.

Beam 20 may have a multi channeled design that is configured for selectively receiving a shoulder of fasteners 31 as best illustrated in FIG. 5. The shoulder of fasteners 31 is configured for being received within a selected one of the multi channeled design and into base 25, where turn knobs may be alternatively provided for securing the base 25 to beam 20. This allows the beam to be rotated in a yaw direction (indicated by the arrow) relative to the support 16 such that clamp assemblies 24, 26 can quickly have their orientation changed. Fasteners 31 are loosened, the beam 20 is slid off the assembly, rotated into a desired position, and then fastened by rotating fasteners 31.

Figure 6:
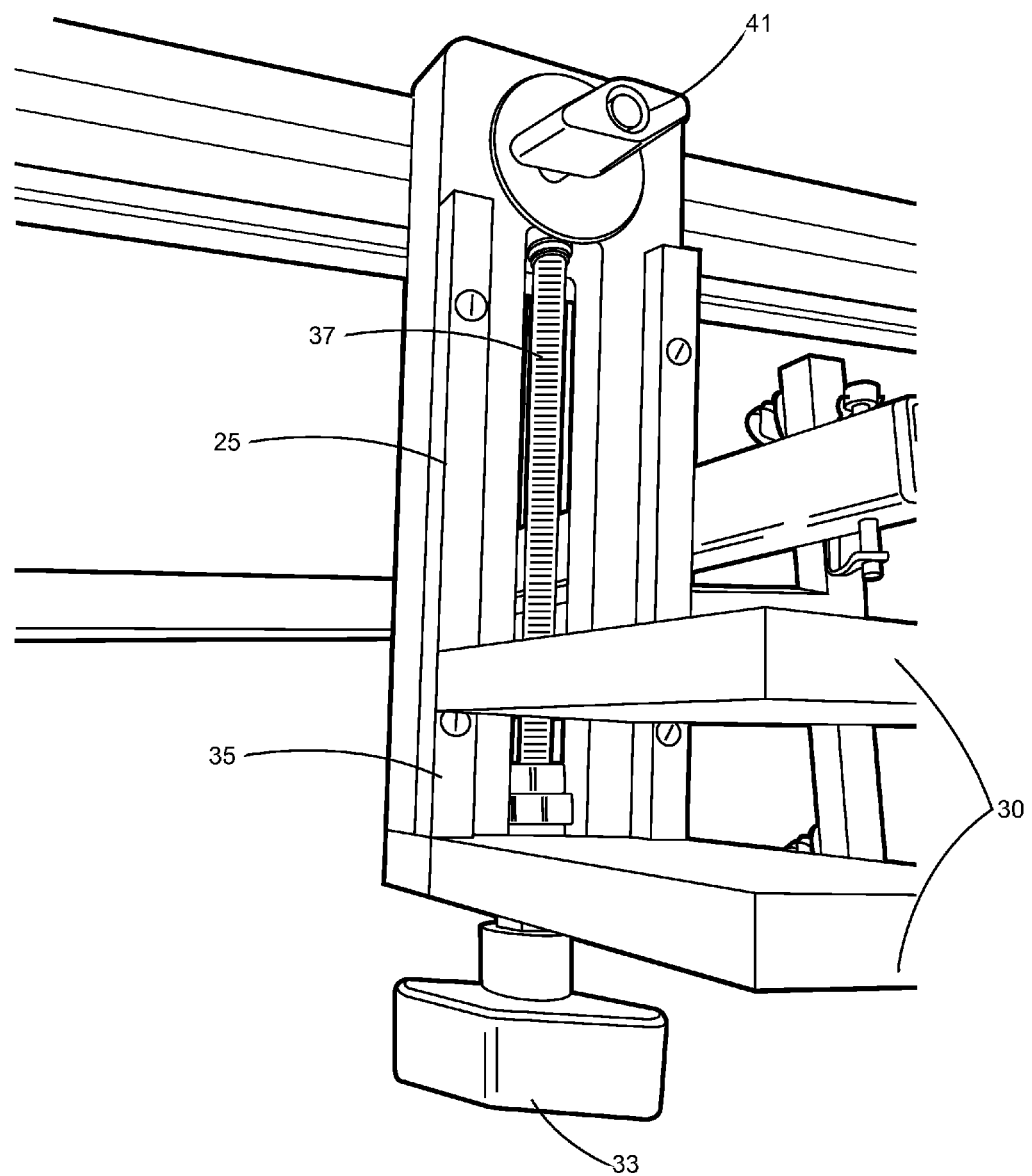
FIG. 6 is a top view of a clamp assembly for use with the mount according to one or more embodiments disclosed herein.

A first and second clamp assembly 24, 26 are provided and extend from beam 20. The first and second clamp assembly 24, 26 are selectively positionable about beam 20 such that the spacing between the first clamp assembly 24 and the second clamp assembly 26 is adjustable. The clamp assemblies 24, 26 are provided for clamping, receiving, or otherwise engaging with a desired portion of an object, such as firearm 12. The clamp assemblies 24, 26 define translatable clamp plates 30 for clamping the object therein. One of the clamp plates 30 may be engaged with a threaded fastener/handle 33 to which rotation thereof imparts movement of the clamp plate 30. The clamp plates 30 may be configured for translating about a low friction sliding surface 35. This low friction sliding surface 35 is also advantageously provided to prevent marring of the object being held by mount 10. The clamp assemblies 24, 26 include an arm 40 pivoted from the beam 20 such that a distal end of a respective clamp assembly moves arcuately relative to the beam 20. This advantageously allows for selective angular placement of the clamp plates 30 to accommodate objects having various angles and configurations. This is additionally illustrated in FIG. 6. A linear translator 37 may be provided about handle 33 to impart translation of one of the clamp plates 30.

In this manner, the angle of a respective clamp assembly 24, 26 can be adjusted by loosening fastener 41 such that a respective clamp assembly can rotate about that fastener, rotating the respective clamp assembly into a desired orientation, locking the clamp assembly 24, 26 into the desired orientation by tightening fastener 41, placing the object such that a portion thereof is received between clamp plates 30, and then tightening fastener 33 until the adjustable clamp plate 30 clamps, contacts, or otherwise engages with the object. This may be accomplished with a shoulder 43 that extends into a desired channel 29A, 29B, 29C, or 29D of beam 20, to which rotation of fastener 41 causes an upward or downward movement of shoulder 43 into engagement with the desired channel. The gun, bow, or other object may then be cleaned or otherwise worked on.

The adaptability of orientation of beam 20 is illustrated in FIG. 3 in which the beam 20 is shown in a generally horizontal orientation and FIG. 4 in which the beam 20 is shown in a generally vertical orientation. Additionally, the adaptability of clamp assemblies 24, 26 is illustrated in FIG. 4 in which clamp assembly 24, for example, is shown having an acute angular relationship relative to beam 20 in order to accommodate the arcuate shape of bow 14 at an end thereof, while clamp assembly 26 also has an acute angular relationship relative to beam 20 in order to accommodate the arcuate shape of bow 14 at another end thereof.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A mount for supporting an object, the mount comprising:
 a support for contacting a ground surface;
 a beam having four longitudinally extending sides and extending from the support, wherein the support defines an arcuate groove that receives a pin extending from the beam to form a pivoting arrangement between the beam and the support; and
 a first clamp assembly and a second clamp assembly extending from the beam for clamping the object thereabout,
 wherein the first clamp assembly and the second clamp assembly are translatable along the length of the beam, and further wherein, the first clamp assembly and the second clamp assembly are pivotable relative to the beam, and
 wherein the first clamp assembly and the second clamp assembly can be positioned into engagement with any of the four longitudinally extending sides to thereby vary the orientation of the first clamp assembly and the second clamp assembly relative to the sides.

2. The mount according to claim 1, wherein the first clamp assembly and the second clamp assembly are each pivotable relative to the beam about a shoulder.

3. The mount according to claim 1, wherein each of the first clamp assembly and the second clamp assembly define a translatable clamp plate and a clamp base, wherein the translatable clamp plate is configured for translating into engagement with a portion of the object.

4. A mount for supporting an object, the mount comprising:

a support for contacting a ground surface;

a beam extending from the support and being pivotable relative thereto about an arcuate groove and a pin assembly;

a first clamp assembly and a second clamp assembly extending from the beam for clamping the object thereabout, wherein the first clamp assembly and the second clamp assembly are translatable along the length of the beam, and further wherein, the first clamp assembly and the second clamp assembly are pivotable relative to the beam; and wherein the beam has four longitudinally extending sides and the first clamp assembly and the second clamp assembly can be positioned into engagement with any of the four longitudinally extending sides to thereby vary the orientation of the first clamp assembly and the second clamp assembly relative to the sides.

5. The mount according to claim 4, further comprising a wheeled assembly carried by the support for providing rolling movement of the mount.

6. The mount according to claim 4, wherein the beam defines a generally upright position and a generally horizontal position.

7. The mount according to claim 4, wherein each of the first clamp assembly and the second clamp assembly define a translatable clamp plate and a clamp base, wherein the translatable clamp plate is configured for translating into engagement with a portion of the object.

\* \* \* \* \*